(12) United States Patent
Ferguson et al.

(10) Patent No.: US 12,048,977 B2
(45) Date of Patent: Jul. 30, 2024

(54) TOOL MEASUREMENT DEVICE FOR A MACHINE TOOL

(71) Applicant: RENISHAW PLC, Wotton-under-Edge (GB)

(72) Inventors: Graham Richard Ferguson, Rodborough (GB); Stephen Lindsey Tocknell, Chalford (GB)

(73) Assignee: RENISHAW PLC, Wotton-under-Edge (GB)

( * ) Notice: Subject to any disclaimer, the term of this patent is extended or adjusted under 35 U.S.C. 154(b) by 158 days.

(21) Appl. No.: 17/432,014

(22) PCT Filed: Mar. 11, 2020

(86) PCT No.: PCT/GB2020/050581
§ 371 (c)(1),
(2) Date: Aug. 18, 2021

(87) PCT Pub. No.: WO2020/183154
PCT Pub. Date: Sep. 17, 2020

(65) Prior Publication Data
US 2021/0385364 A1    Dec. 9, 2021

(30) Foreign Application Priority Data
Mar. 13, 2019 (EP) .................................... 19162622

(51) Int. Cl.
*B23Q 17/24* (2006.01)
*B23Q 17/00* (2006.01)
(Continued)

(52) U.S. Cl.
CPC ......... *B23Q 17/2485* (2013.01); *B23Q 17/00* (2013.01); *H04N 23/52* (2023.01);
(Continued)

(58) Field of Classification Search
CPC ........ H04N 23/52; H04N 23/56; H04N 23/71; H04N 23/72; H04N 23/50; H04N 23/811;
(Continued)

(56) References Cited

U.S. PATENT DOCUMENTS 6,940,554 B2   9/2005   Robins et al.
8,175,757 B2   5/2012   Aggus et al.
(Continued)

FOREIGN PATENT DOCUMENTS

CN   1629675 A   6/2005
CN   101389446 A   3/2009
(Continued)

OTHER PUBLICATIONS

Jul. 1, 2020 Search Report issued in International Patent Application No. PCT/GB2020/050582.
(Continued)

*Primary Examiner* — Christina A Riddle
(74) *Attorney, Agent, or Firm* — Oliff PLC

(57) ABSTRACT

An optical tool measurement device for a machine tool is described. The device includes a light source for directing light towards a tool-sensing region and a sensor for detecting light from the tool-sensing region. A shutter assembly for selectively protecting the sensor from contamination is also provided. The shutter assembly is to provide a closed configuration in which the sensor is covered by the shutter assembly thereby preventing contamination of the sensor and an open configuration in which light can pass to the sensor through a first aperture of the shutter assembly. Furthermore, the shutter assembly is configured to additionally provide a constricted configuration in which light can pass to the sensor through a second aperture of the shutter assembly, the second aperture being smaller than the first aperture. In this manner, the device has enhanced resistance (Continued)

Figure 1:
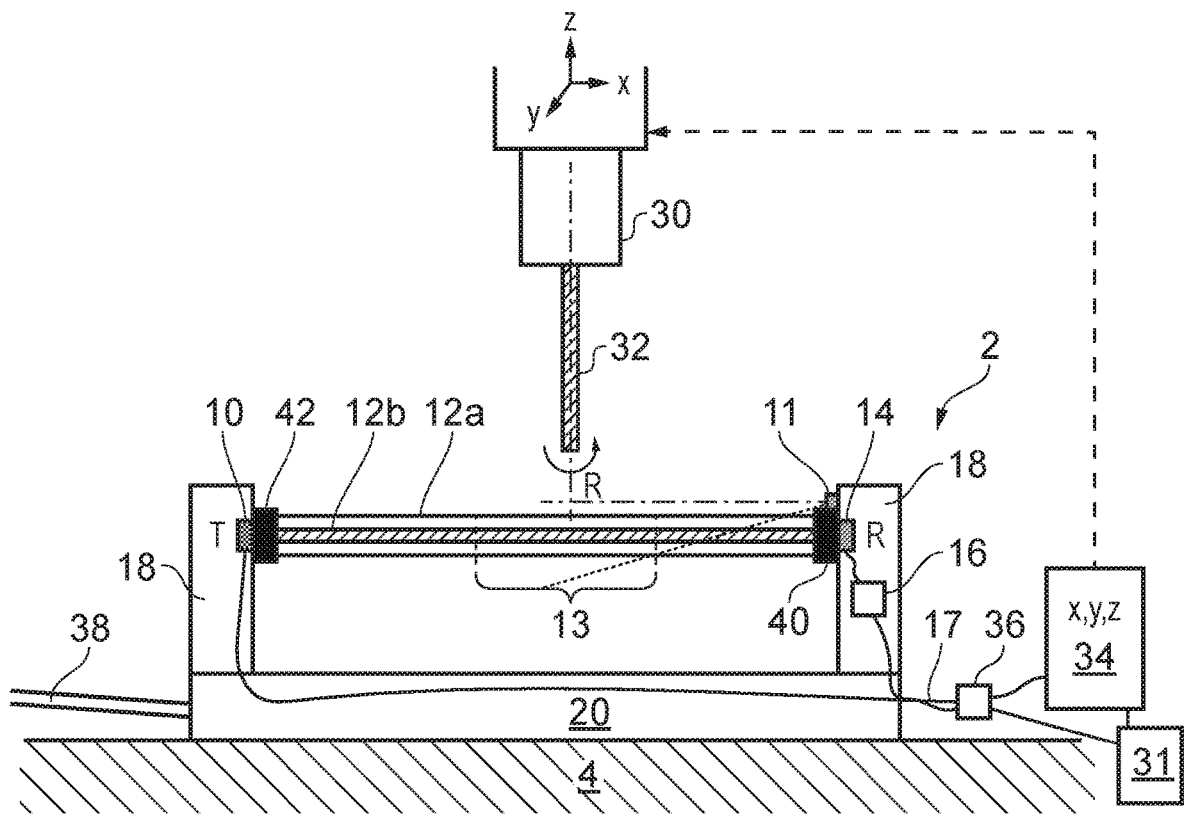

to contaminants, such as swarf and coolant, present in the machine tool environment.

16 Claims, 5 Drawing Sheets

(51) Int. Cl.
*H04N 23/52* (2023.01)
*H04N 23/56* (2023.01)
*H04N 23/71* (2023.01)
*H04N 23/72* (2023.01)

(52) U.S. Cl.
CPC ............. *H04N 23/56* (2023.01); *H04N 23/71* (2023.01); *H04N 23/72* (2023.01)

(58) Field of Classification Search
CPC .... H04N 23/51; B23Q 17/00; B23Q 17/2485; B23Q 11/08; B23Q 11/0825; B23Q 11/0833; B23Q 11/0866; B23Q 17/20; B23Q 17/22; B23Q 17/24; B23Q 3/157; B23Q 17/2457; B23Q 17/2461; B23Q 17/2466; G01N 21/15; G01N 21/94; G01N 21/954; G01N 2021/151–158; G01N 2021/157; G01N 21/8806; G01N 2021/8841; G01N 21/9009; G01N 15/0205; G02B 27/0006; G02B 5/005; G02B 5/006; B08B 5/02; G01B 11/02; G01B 11/024; G01B 11/2433; G01B 21/047; G01B 11/028; G01B 11/24; G01B 11/08; G03B 9/30; G03B 9/12; G03B 9/14; G03B 9/16; G03B 9/20; G03B 9/22; G03B 9/24; G03B 9/26; G03B 9/34; G03B 9/38; G03B 9/40; G03B 9/42; G03B 9/44; G03B 9/08–54; G01F 1/667; G01V 8/12–26; G01D 11/245; G01D 11/26
USPC ............................ 356/237.1–237.6, 614–640
See application file for complete search history.

(56) References Cited

U.S. PATENT DOCUMENTS

| | | | |
|---|---|---|---|
| 8,184,290 B2 | 5/2012 | Hertens et al. | |
| 8,444,330 B2 | 5/2013 | Srivatsan et al. | |
| 8,497,466 B2 | 7/2013 | Martelli et al. | |
| 10,471,515 B2 | 11/2019 | Daut | |
| 10,632,507 B2 | 4/2020 | Nabavi | |
| 11,173,524 B2 | 11/2021 | Nabavi | |
| 11,366,076 B2 | 6/2022 | Magee et al. | |
| 11,433,499 B2 | 9/2022 | Martelli et al. | |
| 2005/0174648 A1 | 8/2005 | Foote et al. | |
| 2007/0177049 A1* | 8/2007 | Kreysar ................... G01J 1/04 348/E5.037 | |
| 2009/0051933 A1 | 2/2009 | Stimpson et al. | |
| 2010/0206384 A1 | 8/2010 | Martelli et al. | |
| 2012/0087647 A1 | 4/2012 | Srivatsan et al. | |
| 2013/0161510 A1* | 6/2013 | O'Connor ........... H01J 49/0463 250/288 |
| 2013/0176429 A1 | 7/2013 | Kurahashi | |
| 2017/0239693 A1 | 8/2017 | Nabavi | |
| 2018/0112969 A1 | 4/2018 | Bucher et al. | |
| 2018/0141129 A1 | 5/2018 | Daut | |
| 2020/0156201 A1 | 5/2020 | Martelli et al. | |
| 2020/0230659 A1 | 7/2020 | Nabavi | |

FOREIGN PATENT DOCUMENTS

| | | |
|---|---|---|
| CN | 101801600 A | 8/2010 |
| CN | 102581700 A | 7/2012 |
| CN | 204228583 U | 3/2015 |
| CN | 105569601 A | 5/2016 |
| CN | 106999994 A | 8/2017 |
| CN | 206632757 U | 11/2017 |
| CN | 107427982 A | 12/2017 |
| EP | 1 050 368 A1 | 11/2000 |
| JP | H04-050601 A | 2/1992 |
| JP | H07-60616 A | 3/1995 |
| JP | H07-151946 A | 6/1995 |
| JP | 2000-24880 A | 1/2000 |
| JP | 2001-108880 A | 4/2001 |
| JP | 2001-328049 A | 11/2001 |
| JP | 2006-343698 A | 12/2006 |
| JP | 2007-301649 A | 11/2007 |
| JP | 2009-270846 A | 11/2009 |
| JP | 2010-513903 A | 4/2010 |
| JP | 2010-538850 A | 12/2010 |
| JP | 2012-86350 A | 5/2012 |
| JP | 2015-182159 A | 10/2015 |
| KR | 101848464 B1 | 5/2018 |
| TW | 201902616 A | 1/2019 |
| WO | 2009/034147 A1 | 3/2009 |
| WO | 2016/058105 A1 | 4/2016 |
| WO | 2018/049137 A1 | 3/2018 |
| WO | 2018/228998 A1 | 12/2018 |
| WO | 2019/053432 A1 | 3/2019 |

OTHER PUBLICATIONS

Jul. 1, 2020 Written Opinion issued in International Patent Application No. PCT/GB2020/050582.
Sep. 20, 2019 Extended Search Report and Written Opinion issued in European Patent Application No. 19162622.5.
Jul. 3, 2020 Search Report issued in International Patent Application No. PCT/GB2020/050581.
Jul. 3, 2020 Written Opinion issued in International Patent Application No. PCT/GB2020/050581.
Aug. 18, 2021 U.S. Appl. No. 17/431,947 in the name of Benjamin Jason Merrifield et al.
Jan. 24, 2020 Search Report issued in Great Britain Patent Application No. GB1910687.1.
Feb. 29, 2024 Notice of Allowance issued in U.S. Appl. No. 17/431,947.
May 22, 2024 Notice of Allowance issued in U.S. Appl. No. 17/431,947.

* cited by examiner

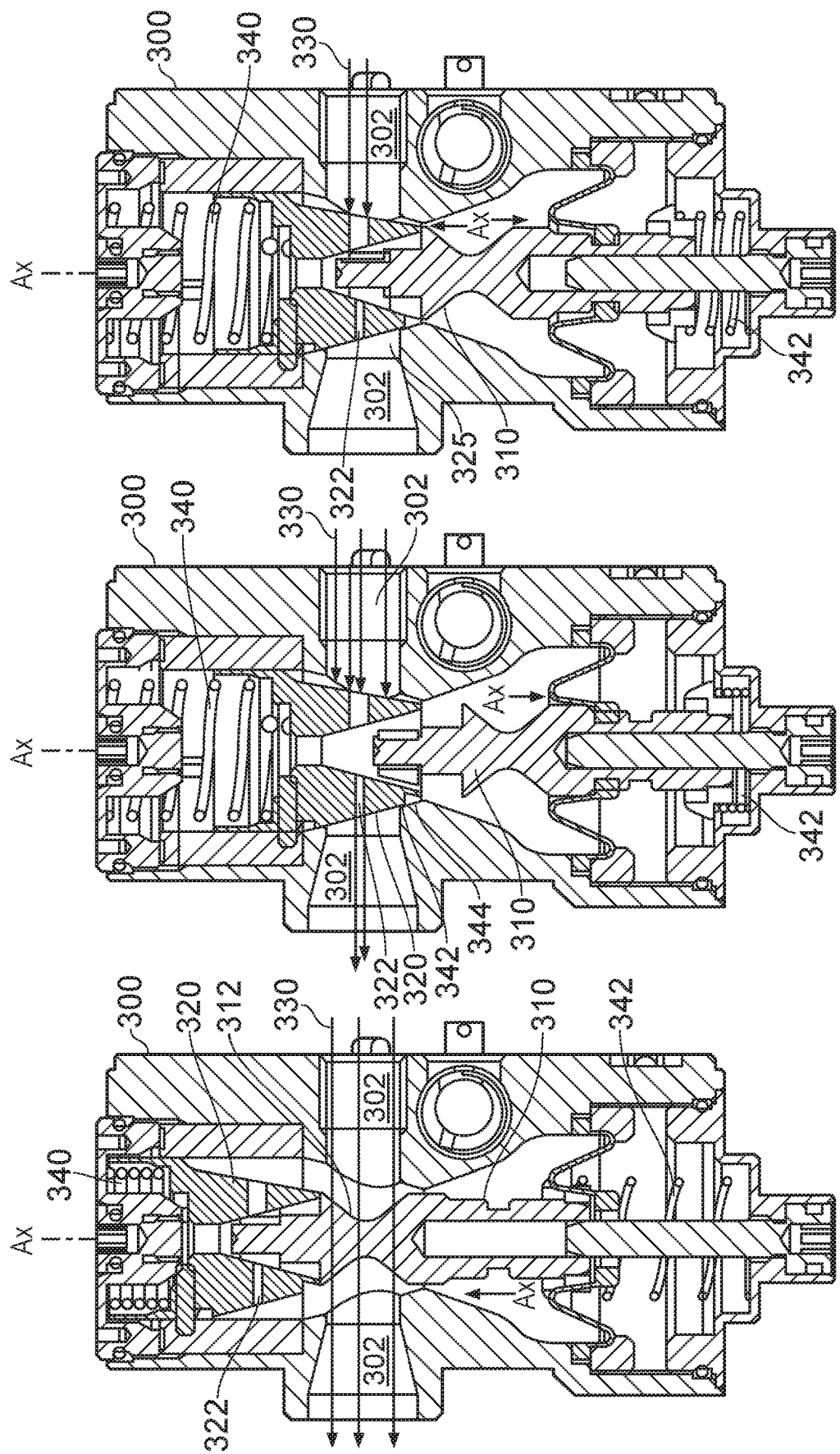

TOOL MEASUREMENT DEVICE FOR A MACHINE TOOL

The present invention relates to an optical tool measurement device for a machine tool, and particularly to improvements for protecting such a device from the harsh environment within a machine tool.

Optical tool measurement devices for use with machine tools or the like are known. One example of such a device is a so-called laser tool setter that detects when a tool breaks a narrow laser beam. This allows tool measurements, such as length and diameter, to be collected. EP1050368 describes such a laser tool setter in which the laser beam can enter and exit the device via narrow apertures. A flow of compressed air out of the apertures is used to reduce the risk of contaminants etc entering the device or obscuring the optical pathway.

Vision or camera-based tool measurement devices are also known in which an imaging sensor captures images of a tool. The CU2 tool measurement system sold by Conoptica, Klaebu, Norway is an example of such a device. A typical vision-based tool setting system includes a light source for illuminating a tool and an imaging sensor for collecting images of that tool. A mechanical shutter is often used to protect the imaging sensor from the harsh machine tool environment. The mechanical shutter is opened when a tool is being inspected and closed to protect the imaging sensor when machining operations, which often use streams of pressurized coolant and generate large amounts of cutting debris, are being performed. The aim of such a mechanical shutter is to keep the imaging sensor as free of contaminants as possible. However, it has been found that contaminants can still be present in the machine tool environment when the shutter is initially opened.

US2010/0206384 describes a further example of a protection system for an optical tool measurement device. The apparatus includes a shutter that can be moved from an open position to a closed position. In the open position, light passes through an aperture to a light sensor. This aperture is sealed when the shutter is in the closed position to prevent contamination of optical components of the device.

A series of nozzles located around the periphery of the aperture also provide a tubular flow of air away from the aperture to help prevent the ingress of contaminants when the shutter is open. The shutter is also arranged such that, when it is moving from the closed position to the open position, a transient blast of air is ejected through the aperture prior to the shutter reaching the open position in which light can pass to the sensor. This transient air blast is intended to clear debris from the aperture before the air nozzles provide the tubular air flow with the shutter held in the open position. This arrangement may be somewhat effective for small apertures but is less effective for the large apertures required in camera-based systems.

According to the present invention, there is provided an optical tool measurement device for a machine tool, comprising;
 a light source for directing light towards a tool-sensing region,
 a sensor for detecting light from the tool-sensing region, and
 a shutter assembly for selectively protecting the sensor from contamination, the shutter assembly being configured to provide a closed configuration in which the sensor is covered by the shutter assembly thereby preventing contamination of the sensor and an open configuration in which light can pass to the sensor through a first aperture of the shutter assembly,
 characterized in that the shutter assembly is configured to additionally provide a constricted configuration in which light can pass to the sensor through a second aperture of the shutter assembly, the second aperture being smaller than the first aperture.

The present invention thus relates to an optical tool measurement device for a machine tool, such as a machining centre, lathe etc. The device includes a light source that may comprise a light emitting diode (LED) and other optical components such as lenses, filters etc. A sensor is also provided for sensing light. The sensor has one or more light sensitive regions and again may include other optical components (e.g. lenses, filters etc.) In one embodiment, light from the light source is directed along a beam path to the sensor via the tool sensing region; the tool sensing region being a region in free-space into which a tool can be inserted.

A shutter assembly is also provided for protecting the sensor from the contamination (e.g. coolant, swarf, chips of material etc) that occurs when machining operations are performed by the machine tool. The shutter assembly may be closed (i.e. adopt the closed configuration) to protect the sensor from such contamination. Such a closed (e.g. sealed) configuration may thus be used during cutting operations and provides a very high level of contamination protection, although of course it means that no measurements can be taken using the device. The shutter assembly may also be placed into an open (e.g. fully open) configuration in which the sensor is uncovered (e.g. fully uncovered). As explained below, if the sensor is an imaging sensor this open configuration allows images of a tool placed in the tool sensing region to be collected. Opening the shutter is, however, only advisable when it can be ensured the machine tool environment is clear. For example, coolant mist and debris may be present in the machine tool environment for a certain time after the cutting operation has been performed. If the shutter is opened during this period of time, contaminants may pass through the shutter and build-up on the sensor thereby degrading performance. Degradation of this type may occur immediately or gradually over time.

In accordance with the present invention, the shutter assembly also provides a constricted configuration in which light can pass to the sensor through a second aperture of the shutter assembly. The second aperture is smaller than the first aperture. This smaller aperture thus reduces the field of view or area from which light can be sensed, but the smaller aperture makes the device more resistant to contamination. The constricted configuration may thus be used to allow tool or other measurements to be taken even in the presence of contamination within the machine tool environment. As explained below, this may involve imaging a smaller part of a tool or operating in an emulation mode in which an overall received light level is measured to determine when a tool blocks the light that would otherwise pass to the sensor.

The device of the present invention can thus operate in a full "vision" mode with the shutter assembly in the open configuration, can be fully sealed against contaminants in the closed configuration and can provide measurement functionally even in the presence of contamination when operating in the constricted configuration. A more flexible and user-friendly device is thus provided. In particular, the contamination resistance advantages of a laser based (break-beam) tool setter can be combined with the additional tool analysis functionality of a vision or camera-based tool setting system.

The sensor may comprise a photodetector having a single active element for sensing the intensity of received light. Alternatively, the sensor may comprise a plurality of pixels or light sensing regions. In a preferred embodiment, the sensor comprises a two-dimensional imaging array comprising a plurality of pixels. In such an embodiment, the first aperture of the open configuration may be sized to allow light to pass to a first set of the plurality of pixels. The first set may include all the pixels of the imaging array. The first set may include only some of the pixels of the imaging array. The (smaller) second aperture of the constricted configuration may be sized to allow light to pass to a second set of the plurality of pixels. The second set preferably contains fewer pixels than the first set.

In a preferred embodiment, the imaging array is operable in an imaging mode in which images can be captured from the first set of the plurality of pixels. The imaging mode is preferably used when the shutter assembly is in the open configuration. If the device is in the constricted configuration, images may still be collected and analyzed over the smaller field of view. Conveniently, the imaging array is also operable in an emulation mode in which the resultant (overall) light intensity falling on the second set of pixels is measured. The emulation mode is preferably used when the shutter assembly is in the constricted configuration. In this manner, vision and break-beam tool measurement methods can be performed by the same device.

The shutter assembly may be provided in a variety of ways. In one embodiment, the shutter assembly comprises a passageway for light to pass to the sensor. The passageway may define the first aperture. Alternatively, the passageway may include an object defining the first aperture. The shutter assembly may also comprise a constriction member defining the second aperture. The constriction member being movable into passageway such that the second aperture constricts the passageway. The shutter assembly may also comprise a closing member. The closing member is advantageously movable into the passageway to close the passageway and thereby cover the sensor. The closing member may also seal the passageway to prevent contamination reaching the sensor. In a preferred embodiment, the constriction member and the closing member are separately movable along a common axis. The constriction member may comprise a central cavity through which the closing member can move.

The shutter assembly may include a plurality of shutter members that can be moved in front of the sensor. All or some of such a plurality of shutter members may include only a single aperture. For example, first and second shutter members may be provided that include first and second apertures respectively. Alternatively, a single shutter member may be provided that comprises a plurality of apertures. For example, a movable shutter member may include both the first and second apertures. In a preferred embodiment, the shutter assembly may comprise a shutter member comprising a first part defining the first aperture, a second part defining the second aperture and a third part having no aperture. The shutter member may be movable (e.g. rotatable, translatable etc) such that the first, second and third parts can be located relative to the sensor to provide the open, constricted and closed configurations respectively. For example, rotation and/or translation of the shutter member may provide the different configurations.

Advantageously, the sensor is substantially sealed from the external environment when the shutter assembly is in the closed configuration. The shutter assembly may thus include appropriate seals to stop the ingress of contaminants (liquid etc) when in the closed configuration.

To provide repeatable and reliable measurements, it is preferred that the first aperture and particularly the second aperture can adopt the same position relative to the sensor each time the open or constricted configurations are adopted. The first aperture and the second aperture can thus each preferably adopt a repeatable position relative to the sensor. For example, the second aperture may adopt a position relative to the sensor that is repeatable to within 100 μm. More preferably, to within 50 μm. More preferably, to within 25 μm. More preferably, to within 10 μm.

A unitary housing may be provided that contains both the shutter assembly and the sensor. In other words, the shutter assembly may be integrated with the sensor. Advantageously, the shutter assembly is provided within a protection unit. Conveniently, the sensor is provided within a receiver unit. The sensor of such a receiver unit may comprise a transparent window through which light is passed to the shutter assembly. The transparent window may seal the receiver unit, thereby protecting its optical components against any contamination that does pass to it (e.g. via the shutter assembly). Removal of the protection unit may allow access to the transparent window of the receiver unit. This allows the transparent window to be cleaned periodically or if the protection unit fails to stop all contamination (e.g. if the shutter assembly is erroneously placed in the open configuration in the presence of contaminants). This removal, cleaning and refitting may be done without disturbing the sensor or the rest of the tool measurement device. The protection unit is preferably removably attachable to the receiver unit in a repeatable position. In other words, the protection unit can be mounted to the receiver unit in substantially the same position each time. This ensures the shutter assembly remains in the same alignment with the sensor, even if the protection unit is removed and replaced. The need to recalibrate the device after removal and replacement of the protection unit can thus be avoided.

The device may receive a supply of pressurized gas, such as compressed air. Advantageously, the device comprises at least one inlet for receiving a supply of gas. Internal conduits may also be provided within the device that allow received gas to be expelled via the second aperture when the shutter assembly is in the constricted configuration. Received gas may thus be routed through and expelled from the device via an aperture or apertures through which light also enters and/or exits the device. The device may comprise pneumatic control valves or the like to control the flow of such received gas. Additional gas nozzles may also be provided; these may help to blow debris away from the device and/or clean a tool to be measured.

Advantageously, the device comprises a controller for directing the shutter assembly to enter any one of the open, closed and constricted configurations. The controller may be wholly or partially located within the casing that contains the sensor and/or the light source. Alternatively, the controller may be wholly or partially located outside of the machine tool enclosure. The configuration adopted by the shutter assembly may be based on a received instruction (e.g. from the machine tool controller). Alternatively, the controller may restrict when a certain shutter assembly configuration can be adopted. Advantageously, the controller analyses the light received by the sensor when the shutter assembly is in the constricted configuration and determines therefrom whether the environment external to the device is sufficiently free from contaminants to allow the shutter assembly to enter the open configuration. In other words, the open configuration may be adopted only if a check performed in the constricted configuration determines the level of contamination is sufficiently low. The check may involve measuring the intensity of received light and/or analyzing images for characteristic variations in intensity. The constricted configuration may be used only for checking the level of contamination. The constricted configuration may be used only for measuring a tool. Advantageously, the constricted configuration may be used for both checking the level of contamination and for measuring a tool.

The shutter assembly may be actuated using any appropriate means. For example, the shutter assembly may be pneumatically activated (i.e. by the supply of compressed gas via one or more gas lines). The shutter assembly may be electrically actuated. The shutter assembly may include at least one spring that causes one configuration (e.g. the closed configuration) to be adopted in the absence of an applied force (e.g. from an electrical actuator or a supply of pressurized gas). In this manner, the device may enter the closed configuration by default if the power or gas supply is cut thereby offering the maximum protection to the sensor.

The device may include a single shutter assembly as described above for protecting the sensor. The light source may not require protection with a shutter assembly (e.g. if a large, wide angle light source is used to illuminate a tool from the front). However, in a preferred embodiment, the light source is also protected by a shutter assembly having any one or more of the features described above in connection with the shutter assembly that protects the sensor. The device may thus comprise an additional shutter assembly for selectively protecting the light source from contamination. The additional shutter assembly may be configured to provide a closed configuration in which the light source is covered by the additional shutter assembly thereby preventing contamination of the light source. The additional shutter assembly may also provide an open configuration in which light from the light source can pass through a first aperture of the additional shutter assembly. The additional shutter assembly may also be configured to provide a constricted configuration in which light from the light source can pass through a second aperture of the shutter assembly, the second aperture being smaller than the first aperture. It should be noted that that light source may comprise optical elements, such as lenses, transparent windows etc.

The sensor may be arranged to detect light from the light source that is reflected from a tool placed in the tool-sensing region. For example, front-lit tool images may be acquired and/or a reflective tool measurement device may be implemented. In a preferred embodiment, the light source is arranged to emit a light beam that passes through the tool-sensing region to the sensor. A tool inserted into the light beam thereby obscures the light received by the sensor. This allows a backlit image of the tool to be acquired. It also allows the presence of a tool to be checked by analyzing when the beam is broken. The light generated by the light source may have any suitable wavelength (e.g. from the infra-red to the ultra-violet part of the spectrum, as desired). The sensor is preferably selected to be sensitive to the wavelength of light emitted by the light source.

Also described herein is a shutter assembly for an optical device for use in a machine tool environment, the shutter assembly being configured to provide a closed configuration in which light is prevented from passing through the shutter assembly, an open configuration in which light can pass through a first aperture of the shutter assembly, and a constricted configuration in which light can pass through a second aperture of the shutter assembly, the second aperture being smaller than the first aperture. The shutter assembly may have features that allow it to be attached to a transmitter (light source) and/or receiver (sensor) of a tool setting device.

Also described herein is an optical tool measurement device for a machine tool, comprising; a light source for directing light towards a tool-sensing region, a sensor for detecting light from the tool-sensing region, and a protection device for protecting the sensor from contamination, wherein the protection device comprises a shutter assembly that can adopt a closed configuration in which the shutter assembly covers the sensor thereby preventing light from reaching the sensor, an open configuration in which the sensor is uncovered thereby allowing light to fall on a first area of the sensor, and a partially open configuration in which the sensor is partially covered by the shutter assembly thereby allowing light to fall on a second area of the sensor that is smaller than the first area of the sensor. The shutter assembly may comprise one or more apertures. The device may also include any of the other features also described herein.

Also described herein is an optical tool measurement device for a machine tool. The device may comprise a light source for directing light towards a tool-sensing region. A sensor may be provided for detecting light from the tool-sensing region. The device may also include a shutter assembly for selectively protecting the sensor from contamination. The shutter assembly may be configured to provide a closed configuration. In the closed configuration, the shutter assembly may cover the sensor thereby preventing contamination of the sensor. The shutter assembly may be configured to provide an open configuration. In the open configuration, light may pass to the sensor through a first aperture of the shutter assembly. The shutter assembly may also provide a constricted configuration. In the constricted configuration, light may pass to the sensor through a second aperture of the shutter assembly. Advantageously, the second aperture is smaller than the first aperture. The device may also include any of the other features also described herein.

Also described herein is a shutter assembly for selectively protecting an optical component (e.g. a sensor or light source etc) from contamination. The shutter assembly may comprise a first shutter member and a second shutter member. The first shutter member and/or the second shutter member may be substantially planar. The first shutter member may be arranged to move relative to the second shutter member. For example, planar surfaces of the first and second shutter members may engage and move (slide) relative to each other (i.e. they may be in sliding contact). The first and second shutter members may move back and forth and/or rotate relative to each other. In one example, the first and second shutter members may comprise first and second disks that can rotate relative to one another. A layer of lubricant (e.g. machine tool coolant) between the first and second shutter members may reduce the friction and/or wear that might otherwise occur due to the sliding contact between the shutter members.

The shutter assembly may comprise an actuation mechanism to provide relative motion between the first and second shutter members. For example, the actuation mechanism may include an actuator (e.g. an electric or pneumatic actuator) for providing the relative motion. The actuation mechanism may also or alternatively comprise a biasing means (e.g. one or more springs) for biasing the first and second shutter members into a predefined relative position (i.e. a rest position). In such an arrangement, the actuator may overcome the biasing force to cause relative movement of the first and second shutter members away from the predefined (rest) position. The shutter assembly may comprise a shutter housing. The first shutter member may have a fixed (invariant) position relative to the shutter housing. In such an example, the actuation mechanism may move the second shutter member relative to the shutter housing (and the first shutter member).

The first shutter member of the above described shutter assembly may include a single aperture. An optical component to be protected may be located adjacent the aperture in the first shutter member (i.e. so light may pass through the aperture of the first shutter member to and/or from the optical component). The second shutter member may include an aperture. Relative motion of the first and second shutter members may align the aperture of the second shutter member with the aperture of the first shutter member; light may then pass to and/or from the optical component. The second shutter member may be moved away from the aligned position so that a solid portion of the second shutter member blocks the aperture of the first shutter member; this closed or sealed state protects the optical component from contamination. The shutter assembly may provide only an open state and a closed state. Alternatively, the second shutter member may comprise a plurality of apertures (e.g. apertures of different sizes) to enable a plurality of different states (e.g. open and partially open or constricted states) to be provided by changing the relative position of the first and second shutter members.

The above described shutter assembly may be used to protect optical components (e.g. lasers, photodetectors, imaging sensors etc) from the harsh environment of a machine tool. A flow of gas (e.g. air) may be ejected via the apertures to help prevent contamination of the optical component being protected even when the shutter assembly is in an open state. In a preferred example, a non-contact tool setting device may include a shutter assembly as described above. The shutter assembly may be formed integrally with the optical component being protected or it may be attachable (e.g. releasably attachable) to such an optical component. The above described shutter assembly, in particular the sliding arrangement of the shutter members, has been found to reduce the possibility of debris being trapped or captured by the shutter assembly when moving between different states, whilst still providing a good fluid seal against coolant and other contaminants when in the closed state.

Figure 2A:
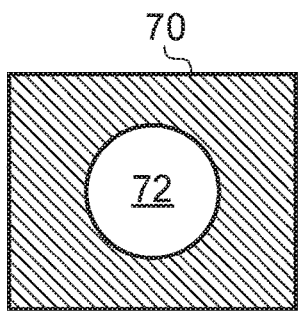
Figure 2B:
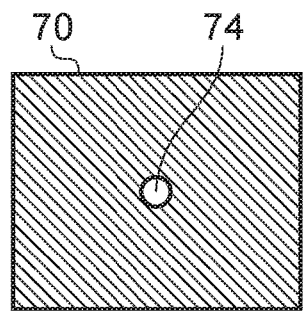
Figure 2C:
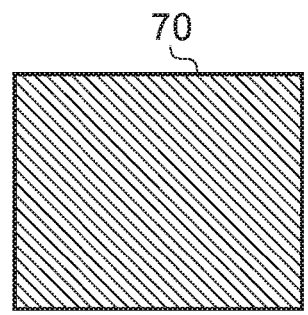
Figure 3:
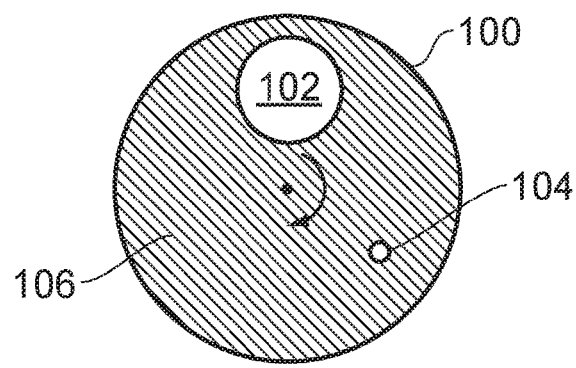
Figure 4:
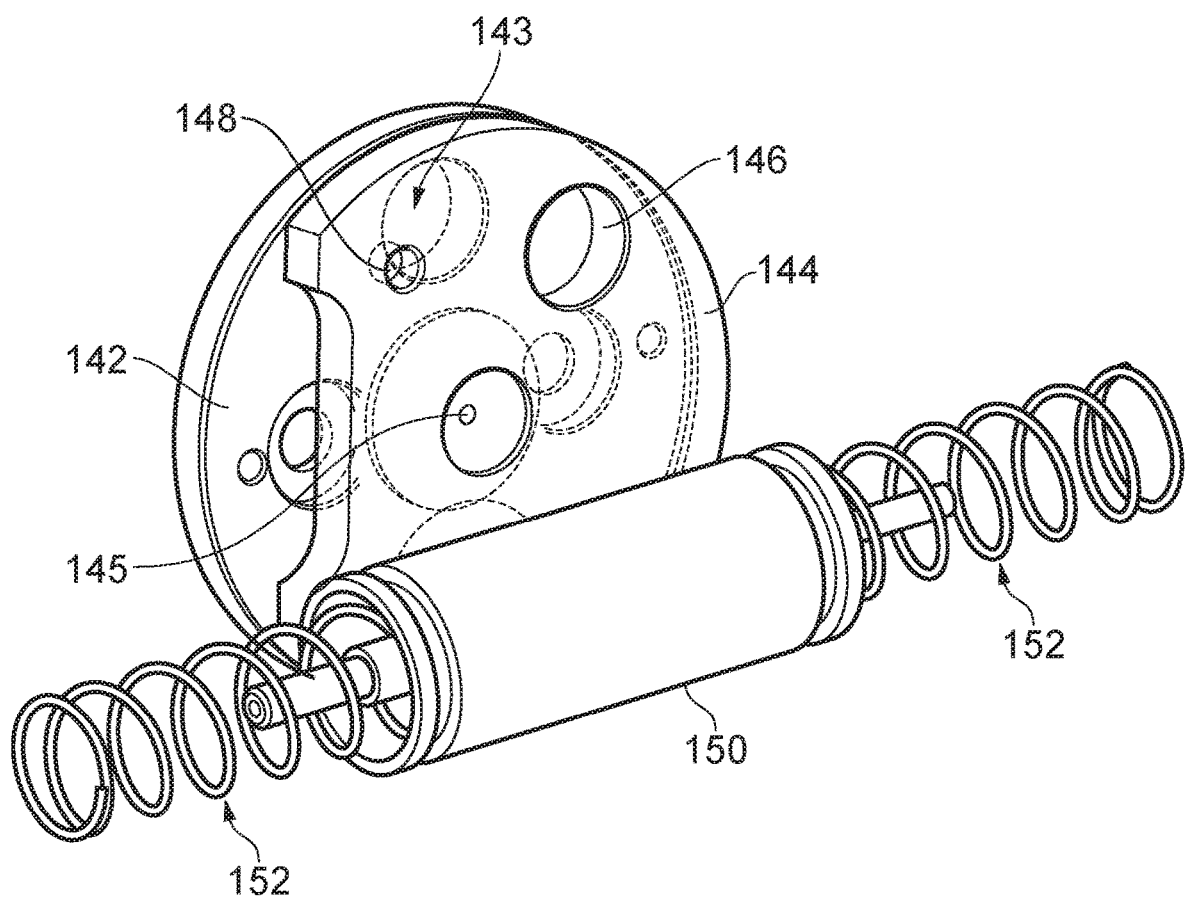
Figures 5A, 5B, 5C:
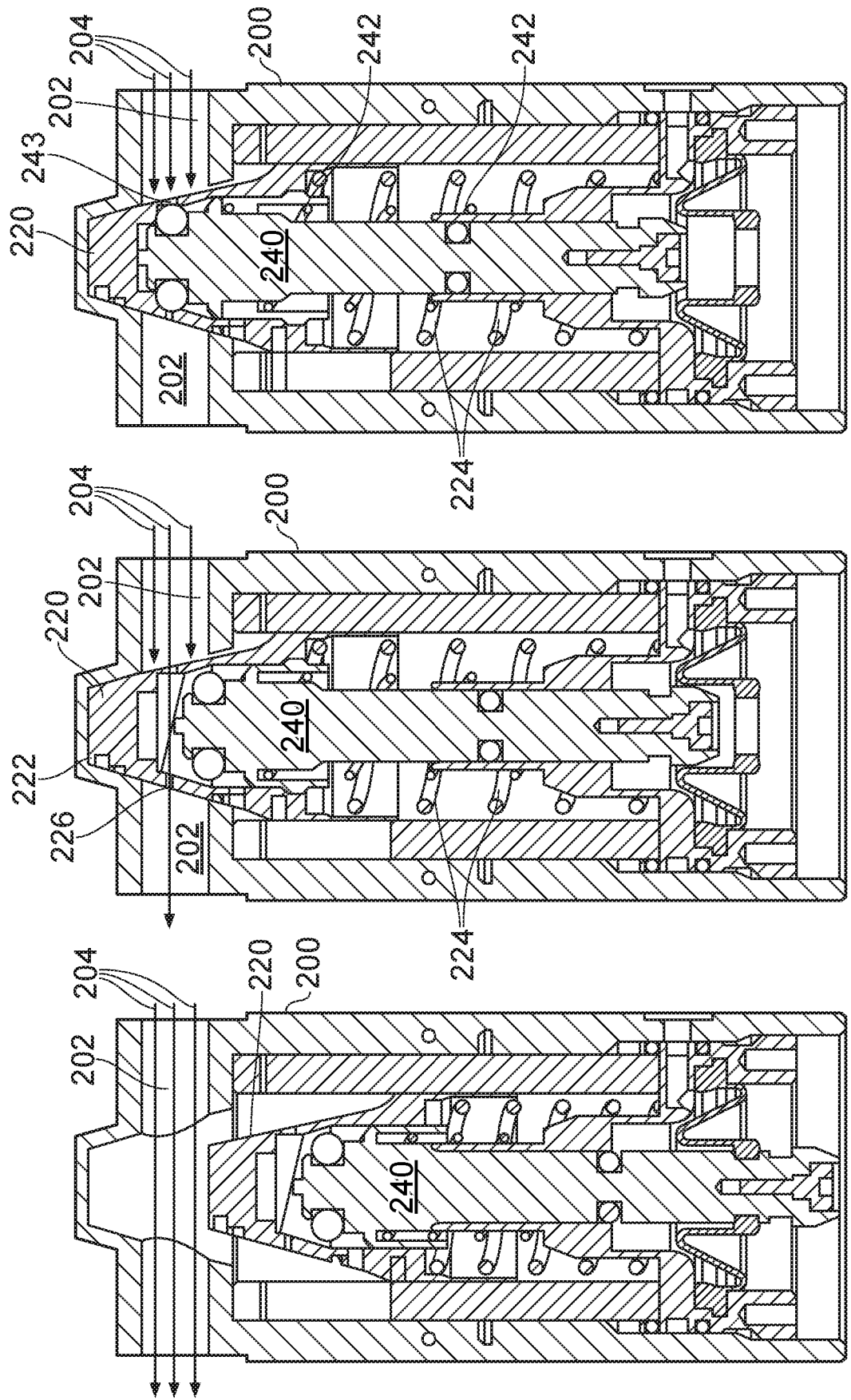
Figure 7:
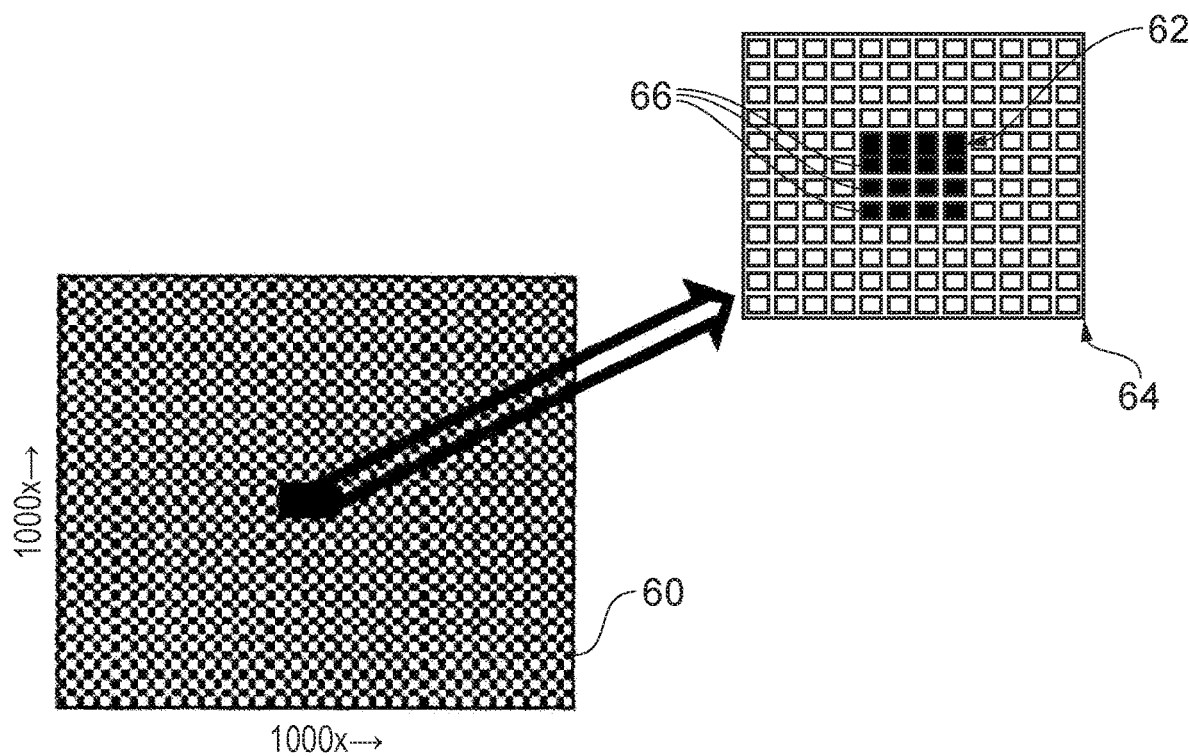

The invention will now be described, by way of example only, with reference to accompanying drawings in which;

FIG. 1 shows a tool setter of the present invention,

FIGS. 2a-2c show the three configurations of the shutter assembly of the device of FIG. 1, FIG. 3 shows a disk-shaped rotatable shutter, FIG. 4 shows a shutter assembly comprising a rotatable disk, FIGS. 5a-5c show a dual cone shutter assembly, FIGS. 6a-6c show a shutter assembly having shutter members in the form of opposing cones, and FIG. 7 illustrates the concept of operating the device in an imaging mode and an emulation mode.

Referring to FIG. 1, a tool setting device 2 of the present invention is illustrated when mounted to the bed 4 of a machine tool. The tool setting device 2 comprises an LED light source 10 that emits a light beam. An imaging sensor 14 is also provided that comprises an array of 1000-by-1000 pixels (i.e. a 1 Megapixel array) for sensing light. The light source 10 and sensor 14 include appropriate optical elements (e.g. lenses etc). An analysis unit 16 (e.g. comprising a processor) is provided for analyzing the intensity data collected by the imaging sensor 14. The light source 10 and imaging sensor 14 are contained within and affixed to a common base 20 by pillars 18. The light beam from the light source 10 is blocked from reaching the sensor 14 by opaque objects (e.g. tools) placed in the tool-sensing region 13. A secondary light source 11 may also be provided for front-lighting the tool.

The machine tool to which the tool setting device 2 is mounted also includes a spindle 30 for holding a tool 32. The spindle is rotatable about rotation axis R (i.e. to allow the tool to be rotated about its longitudinal axis). The spindle 30 is rotated and moved around within the machine tool under the control of a numerical controller or NC 34 that includes a processor. The tool setting device 2 is also connected to the NC 34 via an interface 36. The interface 36 is connected to the tool setting device 2 via electrical cables 17. The interface 36 provides electrical power to the tool setting device. In addition, the interface 36 is connected to an external computer 31 for performing more complex processing tasks (such as image analysis). It should be noted that the computer 31 may also direct operation of the NC 34 (e.g. by sending a series of movement instructions that are acted upon by the NC 34). It should also be noted that the interface 36 does not have to be a discrete unit and may be formed as part of the NC 34 or the external computer 31. In use, the machine tool (under control of the NC 34) can move the tool 32 into, and out of, the light beam as required thereby allowing the tool to be measured.

The tool setting device 2 also includes a first shutter assembly 40 for protecting the imaging sensor 14 and a second shutter assembly 42 for protecting the light source 10. The first and second shutter assemblies 40 and 42 can each adopt three different configurations, namely open, closed and constricted configurations. If the first and second shutter assemblies both adopt the open configuration they provide a relatively wide aperture for the passage of light. In particular, a relatively wide light beam 12a is generated that passes from the light source 10 to the imaging sensor 14. In the absence of any obstructions, the beam 12a is dimensioned to fully illuminate the active area (i.e. the 1000 by 1000 pixels) of the imaging sensor 14. In this manner, a tool placed in the tool sensing region 13 may be inspected using the back-lit image of the tool that is generated by the imaging sensor 14. If the first and second shutter assemblies are both placed in the closed configuration, they seal the light source 10 and the sensor 14 from the machine tool environment. In this closed configuration, the light source 10 and sensor 14 are protected against contamination from the large amounts of coolant and cutting debris that are typically present when the machine tool performs a cutting operation. Measurement is, of course, not possible in the closed configuration.

In accordance with the present invention, the first and second shutter assemblies 40 and 42 can also adopt a constricted configuration. This may also be termed a partially open, restricted or limited configuration. In such a constricted configuration, the shutter assemblies each define a small aperture (i.e. an aperture smaller than the aperture of the open configuration). The small aperture of the first shutter assembly 40 restricts the amount of light directed towards the sensor 14; i.e. the illustrated "narrow" light beam 12b is produced. The small aperture of the second shutter assembly 42 partially covers the imaging sensor 14. The first and second shutter assemblies 40 and 42 are appropriately aligned so that, in the absence of a tool, the narrow light beam 12b passes through the small aperture of the second shutter assembly 42 and falls on the imaging sensor 14.

In the constricted configuration, it is still possible to sense a tool placed in the tool sensing region 13 but the field of view of the device is reduced. It is possible to capture images of the tool over this smaller field of view or, as described in more detail below, the device could be operated in an emulation mode in which the total intensity of light reaching the sensor is analyzed. Such an emulation mode would allow the detection of a tool entering and/or leaving the light beam 12b in a similar manner to a laser tool setting device of the type described above. The constricted configuration could also be used to sense the cleanliness of the machine tool environment. For example, the amount or pattern of light reaching the sensor could be analyzed to determine if coolant mist, swarf etc are still present in the local environment. The open configuration may then be adopted if the analysis determines the environment is sufficiently clean.

Providing the constricted configuration (i.e. with a smaller aperture) has the advantage of providing a device that is more resistant to contamination than when it is in the (fully) open configuration. In other words, the smaller aperture decreases the amount of contamination that can pass to the sensor or light source. Further protection is possible by providing a flow of gas (e.g. compressed air) out of the device via the apertures of the shutter assemblies. In this example, such compressed air may be received from a compressed air supply tube 38. The constricted configuration can thus have a similar resistance to contamination as laser based non-contact tool setting devices, but with the advantage that a full imaging mode (i.e. with the shutter assemblies in the open configuration) can also be adopted as required (e.g. when the machine tool environment is clear from coolant mist or cutting debris).

The interface 36 controls operation of the device. In particular, the interface 36 can command the device to enter any one of the closed, open and constricted configurations. These are all stable configurations that can be maintained for as long as required. Although it is envisaged that both shutter assemblies would adopt the same configuration at any single point in time, it would be possible to separately set the configuration of the first and second shutter assemblies 40 and 42. The interface 36 may receive instructions from the controller 34 and/or external computer 31 and set the appropriate configuration accordingly.

Referring to FIGS. 2a, 2b and 2c, the open (fully open), constricted (partially open) and closed configurations of a shutter assembly 70 of the type described with reference to FIG. 1 are illustrated. The open configuration of FIG. 2a provides a first (large) aperture 72 that is dimensioned so that a light beam may pass though it that has a width slightly greater than the width of the imaging sensor. FIG. 2b shows a second (small) aperture 74 of the constricted configuration. The second aperture 74 is smaller than the first aperture 72; the terms "small" and "large" being used to refer to the relative sizes of such apertures. As shown in FIG. 2c, the closed configuration includes no aperture and in this closed configuration a physical and optical barrier is provided that protects the associated light source or sensor. The closed configuration may provide a fluid tight seal.

It should be noted that although circular cross-section apertures are illustrated, the apertures may have any suitable shape. For example, the aperture shape may be selected to correspond to the shape of the sensor. The use of a single aperture per configuration is shown, but it would also be possible for one configuration to provide a plurality of apertures. For example, the constricted configuration may provide a plurality of small apertures that allow a plurality of sections of the imaging sensor to be illuminated. The above example also assumes the open configuration provides an aperture that allows the whole of the imaging sensor to be illuminated, but again this is not essential. The open configuration may only cause some of the imaging sensor to be illuminated. Furthermore, the shutter assembly may provide the constricted configuration shown in FIG. 2b and at least one additional constricted configuration. The additional configuration may have an aperture smaller and/or larger than the aperture of the constricted configuration and/or have one or more apertures.

Referring to FIG. 3, a shutter member 100 is shown that can form part of a shutter assembly. The shutter member 100 includes a large aperture 102, a small aperture 104 and a solid region 106 with no aperture. In use, a sensor (or light source) is placed behind the shutter member. The shutter member 100 can then be rotated about its centre so that light may reach the sensor via the small aperture or large aperture as required.

FIG. 4 shows a shutter assembly mechanism 140 that includes a fixed disc 142 and a rotatable disc 144. The fixed disc 142 can be secured to a housing that contains a sensor (or light source) such that the sensor (or light source) is adjacent (behind in the view of FIG. 4) an access hole 143 formed in the fixed disc 142. The centre of the rotatable disc 144 is attached to the fixed disc 142 via a rotary linkage 145 that allows the rotatable disc 144 to be rotated about its centre. The rotatable disc 144 includes a first (large) aperture 146 and a second (small) aperture 148. An actuation piston 150 is held in a central position by centering springs 152. When the actuation piston 150 is in the central position illustrated in FIG. 4, the rotatable disc 144 blocks the access hole 143 thereby preventing light from reaching the sensor; i.e. the closed configuration is provided. The actuation position 150 can be energized to moved back and forth, thereby rotating the rotatable disc 144. This rotation can, depending on the direction of rotation, bring the first (large) aperture 146 or the second (small) aperture 148 into alignment with the access hole 143. In this manner, the open and constricted configurations can be provided. In the absence of an applied force, the springs bias the assembly into the closed configuration.

Although closed, open and constricted configurations are described in the above embodiment, the rotatable disc 144 may, as an alternative to the presently claimed invention, include only a single aperture. The shutter assembly mechanism 140 may then be used to selectively protect any optical component (e.g. by being opened or closed as required). This alternative concept is also described in more detail above and may further comprise any one or more of the other features also described herein.

Referring to FIGS. 5a to 5c, a further example of a shutter assembly is illustrated in the open, constricted and closed states respectively. The shutter assembly comprises a housing 200 having a passageway 202.

FIG. 5a shows the shutter assembly in the open configuration in which the passageway 202 is unobstructed. The diameter of the passageway 202 thus defines a (fully open) first aperture. In this open configuration, a light beam 204 can pass through the shutter assembly (e.g. to a sensor or from a light source) but the large aperture would provide only minimal protection against contaminants passing into any device protected by the shutter assembly.

FIG. 5b shows the shutter assembly in the constricted configuration. In this constricted configuration, a constriction member 220 is pushed upwards by the action of a first spring 224 into the passageway 202. The upper end of the constriction member 220 passes through the passageway 202 and engages stop features 222 provided within the body of the housing. The distal end of the constriction member 220 and the stop features 222 are arranged such that, when engaged, the constriction member 220 always adopts the same position relative to the passageway 202 and housing 200. In particular, the stop feature 222 and the constriction member 220 include complementary kinematic or pseudo-kinematic features (e.g. a set of spaced apart balls and a corresponding set of rollers) that provide the same (repeatable) position when engaged. The constriction member 220 is opaque but has a small channel or aperture 226 that is located within the passageway. This allows some of the light beam 204 to pass though the shutter assembly. Furthermore, compressed air introduced into the hollow interior of the constriction member 220 is expelled via the small aperture. This small aperture in combination with the supply of air provides a high level of protection against contamination passing through the shutter assembly.

FIG. 5c shows the shutter assembly in the closed configuration. In this closed configuration, a closing member 240 located within the constriction member is pushed upwardly by a second spring 242. The closing member blocks the aperture of the constriction member 220. The closing member 240 also includes an O-ring 243 to provide a fluid tight seal to further prevent the ingress of contaminants. The constriction member 220 and the closing member 240 thus completely block the passageway 202 and provide a seal against any contamination passing through the shutter assembly.

As explained above, compressed air is used to move the constriction member 220 and the closing member 240 against the spring forces applied by the first spring 224 and second spring 242. The shutter assembly thus adopts the closed configuration in the absence of a compressed air supply, but the appropriate supply of compressed air can cause the constricted or open configurations to be adopted as required. Although such a pneumatic arrangement is convenient, an electrically actuated or other actuation arrangement could alternatively be provided.

The shutter assembly shown in FIGS. 5a-5c may be integrated into the tool setting device (e.g. into a device as described above with reference to FIG. 1). In other words, it may be formed as an integral part of such a device that can't be removed during normal maintenance or use. Alternatively, a protection unit may comprise the shutter assembly shown in FIGS. 5a-5c. The protection unit may comprise the housing 200 in which the shutter assembly is located. The protection unit may then be releasably attached to the body of a tool setting device. For example, the body of the tool setting device may have features that co-operate with corresponding features of the protection unit to allow attachment and detachment as and when required. The attachment may be repeatable. The repeatable attachment may include a kinematic connection. In such an embodiment, the protection unit can be readily removed and replaced when required. This removal may be performed to clean parts that are normally protected by the shutter assembly; for example, a sensor or light source (which may include a protective transparent window) may be periodically cleaned or cleaned if, for example, the shutter assembly is accidentally placed into the open configuration in the presence of contaminants.

FIGS. 6a to 6c show an alternative to the shutter assembly described above with reference to FIGS. 5a to 5c.

FIGS. 6a to 6c show a shutter assembly that includes a housing 300 with a central passageway 302 through which light may pass to a detector and/or from a light source. A first member 310 contained within the housing 300 is movable back and forth along a linear axis $A_x$. A second member 320 also contained within the housing 300 is also movable back and forth along the same axis $A_x$. The first member 310 includes a first (large) aperture 312 and the second member 320 includes a second (small) aperture 322. As described above, the shutter assembly may be releasably attachable to the body of a tool setting device or permanently integrated therewith.

The fully open configuration of the shutter assembly is shown in FIG. 6a. In this open configuration, the first member 310 is pushed upwards by a pneumatic force so that the first (large) aperture 312 is located within the central passageway 302. The first member 310 also engages the second member 320 and pushes it upwards out of the passageway 302. A light beam 330 of a relatively large diameter can thus pass through passageway 302.

The constricted configuration of the shutter assembly is shown in FIG. 6b. In this constricted configuration, the first member 310 is retracted (moved downwards) by a pneumatic force. The second member 320 is urged into the passageway 302 under the action of the force applied by the spring 340. The second member 320 has tapered surfaces 342 that engage correspondingly tapered features 344 formed within the housing thereby locating the second member 320 in a required position relative to the passageway 302. As described above, appropriate features (e.g. kinematic features) may be used to provide the necessary level of positional repeatability. The second (small) aperture 322 is thus located within the passageway 302 and constricts the passageway 302 accordingly. Air can also be ejected from the second aperture 322 in this configuration.

FIG. 6c shows the closed configuration. In this configuration, the second member 320 is urged into the passageway 302 under the action of the force applied by the spring 340 and adopts the same position as per the constricted configuration. However, the first member 310 is also pushed upwards by its associated spring 342 and the distal end of the first member 310 enters a central gap within the second member 320 thereby blocking and sealing the passageway 302. This configuration is adopted in the absence of any applied pneumatic force; i.e. the springs 340 and 342 bias the first and second members into this closed configuration if the compressed air supply to the shutter assembly is turned off.

Referring to FIG. 7, the operation of the above described tool setting device in a vision and laser emulation mode will be described. As mentioned above, the imaging sensor of the device of FIG. 1 has a 1000-by-1000 array of pixel elements; this is illustrated as imaging sensor 60 in FIG. 7. Each of these pixel elements can detect the intensity of received light and the received light intensity from every pixel can be read out from the imaging sensor 60. However, reading the intensity data from the one million pixels can only be done at a rate of around 50 Hz even though the bus speed of the imaging sensor is around 50 MHz. For comparison, a typical prior art laser-based tool setter (in which beam intensity is measured using a single photodiode) has a bandwidth of more than 20 kHz. If a trigger signal is to be generated when a certain proportion of the beam (e.g. 50%) is blocked by a tool passing into the beam, the rate at which the beam intensity is measured dictates the accuracy of the position measurements that are possible for a given speed of tool movement. It can thus be seen that reducing the rate of beam intensity measurement from 20 kHz to 50 Hz would greatly decrease measurement precision or mean the tool had to be moved at a much slower speed.

The device 2 when in constricted mode uses the analysis unit 16 to extract beam intensity information from only a very small subset 62 of the pixels of the imaging sensor 60 (i.e. at least some of the pixels that are illuminated by the reduced size light beam). In the present example, the light intensity received by a subset 62 of only sixteen pixels of the one million pixels of the imaging sensor 60 is passed to the analysis unit 16; these sixteen pixels are shown as solid blocks 66 in the expanded view of the imaging sensor 60 provided in the inset 64 to FIG. 7. In this manner, it has been found to be possible to extract intensity data (i.e. for the sixteen pixels of the subset of pixels) at a rate of 100 kHz or more.

The analysis unit 16 then combines (i.e. sums) the intensity values measured by each of the subset 62 of the pixels of the imaging sensor to produce a resultant beam intensity value. The analysis unit 16 also compares the resultant beam intensity value to a threshold. In particular, a "beam clear" intensity value is set to equal the resultant beam intensity value that occurs when no object is located in the light beam. The analysis unit 16 may then compare the resultant beam intensity value to the beam clear intensity value and issue a trigger signal when a certain intensity threshold is crossed. For example, the trigger signal may be issued when the resultant beam intensity value crosses a threshold equal to half the beam clear intensity value. This trigger signal may then be communicated to the NC 34 via the interface 36.

The device can thus emulate the operation of a laser-based tool setter that includes a single element photodiode. The 20 kHz frame rate for generating the resultant beam intensity value means that measurements have a similar accuracy to prior art tool setting systems. This also allows the tool setting apparatus 2 to replace an existing laser-based tool setter without having to alter the measurement routines that are used with the apparatus. In other words, backward compatibility with existing laser-based tool setters can be provided. The tool setting apparatus 2 can, however, also provide vision-based measurement functionality when the shutter assembly is in the open configuration. More details about such an emulation mode can be found in the present Applicant's prior filed PCT patent application PCT/GB2018/052600, the contents of which are hereby incorporated by reference.

It should be remembered that the above are merely examples of the present invention. The skilled person would fully appreciate, in view of the present disclosure, the various alternatives and modifications to the above examples that would be possible.

The invention claimed is:

1. An optical tool measurement device for a machine tool, comprising:
   a light source for directing light towards a tool-sensing region;
   a sensor for detecting light from the tool-sensing region; and
   a shutter assembly for selectively protecting the sensor from contamination, the shutter assembly being configured to provide (i) a closed configuration in which the sensor is covered by the shutter assembly thereby preventing contamination of the sensor and (ii) an open configuration in which light can pass to the sensor through a first aperture of the shutter assembly, wherein:
   the shutter assembly is configured to additionally provide a constricted configuration in which light can pass to the sensor through a second aperture of the shutter assembly, the second aperture being smaller than the first aperture;
   the first and second apertures provide openings that are accessible from an exterior of the device when the shutter assembly is in the open or the constricted configuration;
   the shutter assembly provides a physical barrier to prevent ingress of contaminants when in the closed configuration; and
   the constricted configuration provides more resistance against the ingress of contaminants than the open configuration.

2. The device according to claim 1, wherein the sensor comprises a two-dimensional imaging array comprising a plurality of pixels, the first aperture of the open configuration being sized to allow light to pass to a first set of the plurality of pixels and the second aperture of the constricted configuration being sized to allow light to pass to a second set of the plurality of pixels, the second set containing fewer pixels than the first set.

3. The device according to claim 2, wherein the imaging array is operable in an imaging mode in which images can be captured from the first set of the plurality of pixels and an emulation mode in which resultant light intensity falling on the second set of pixels is measured.

4. The device according to claim 1, wherein the shutter assembly comprises a passageway for light to pass to the sensor, the passageway defining the first aperture.

5. The device according to claim 1, wherein the shutter assembly comprises a shutter member comprising a first part defining the first aperture, a second part defining the second aperture and a third part having no aperture, the shutter member being moveable such that the first, second and third parts can be located relative to the sensor to provide the open, constricted and closed configurations respectively.

6. The device according to claim 1, wherein the sensor is substantially sealed from environment external to the device when the shutter assembly is in the closed configuration.

7. The device according to claim 1, wherein the first aperture and the second aperture can each adopt a repeatable position relative to the sensor.

8. The device according to claim 1, wherein the shutter assembly is provided within a protection unit and the sensor is provided within a receiver unit, the protection unit being removably attachable to the receiver unit in a repeatable position.

9. The device according to claim 1, wherein at least one inlet is provided for receiving a supply of gas and internal conduits within the device allow received gas to be expelled via the second aperture when the shutter assembly is in the constricted configuration.

10. The device according to claim 1, comprising an additional shutter assembly for selectively protecting the light source from contamination, the additional shutter assembly being configured to provide (i) a closed configuration in which the light source is covered by the additional shutter assembly thereby preventing contamination of the light source and (ii) an open configuration in which light from the light source can pass through a first aperture of the additional shutter assembly, the additional shutter assembly also being configured to additionally provide a constricted configuration in which light from the light source can pass through a second aperture of the shutter assembly, the second aperture being smaller than the first aperture.

11. The device according to claim 1, wherein the light source is arranged to emit a light beam that passes through the tool-sensing region to the sensor, a tool inserted into the light beam thereby obscuring the light received by the sensor.

12. The device according to claim 1, wherein contaminants can pass through the shutter assembly when in the open configuration, the contaminants building-up and thereby restricting light from reaching the sensor.

13. An optical tool measurement device for a machine tool, comprising:
- a light source for directing light towards a tool-sensing region;
- a sensor for detecting light from the tool-sensing region; and
- a shutter assembly for selectively protecting the sensor from contamination, the shutter assembly being configured to provide (i) a closed configuration in which the sensor is covered by the shutter assembly thereby preventing contamination of the sensor and (ii) an open configuration in which light can pass to the sensor through a first aperture of the shutter assembly, wherein the shutter assembly is configured to additionally provide a constricted configuration in which light can pass to the sensor through a second aperture of the shutter assembly, the second aperture being smaller than the first aperture,
- the shutter assembly comprises a passageway for light to pass to the sensor, the passageway defining the first aperture, and
- the shutter assembly comprises a constriction member defining the second aperture, the constriction member being moveable into the passageway such that the second aperture constricts the passageway.

14. The device according to claim 13, wherein the shutter assembly comprises a closing member, the closing member being moveable into the passageway to close the passageway and thereby cover the sensor.

15. The device according to claim 14, wherein the constriction member and the closing member are separately moveable along a common axis, the constriction member comprising a central cavity through which the closing member can move.

16. An optical tool measurement device for a machine tool, comprising:
- a light source for directing light towards a tool-sensing region;
- a sensor for detecting light from the tool-sensing region;
- a shutter assembly for selectively protecting the sensor from contamination, the shutter assembly being configured to provide (i) a closed configuration in which the sensor is covered by the shutter assembly thereby preventing contamination of the sensor, (ii) an open configuration in which light can pass to the sensor through a first aperture of the shutter assembly, and (iii) a constricted configuration in which light can pass to the sensor through a second aperture of the shutter assembly, the second aperture being smaller than the first aperture; and
- a controller for directing the shutter assembly to enter any one of the open, closed and constricted configurations, wherein the controller analyses the light received by the sensor when the shutter assembly is in the constricted configuration and determines therefrom whether environment external to the device is sufficiently free from contaminants to allow the shutter assembly to enter the open configuration.

* * * * *